March 2, 1954  K. D. HARP  2,670,939

MIXING PADDLE

Filed April 4, 1952

INVENTOR.
KENNETH D. HARP
BY Patrick D Beaver
ATTORNEY

Patented Mar. 2, 1954

2,670,939

UNITED STATES PATENT OFFICE 2,670,939

MIXING PADDLE

Kenneth D. Harp, Salinas, Calif., assignor of one-half to James P. McNally, Monterey, Calif.

Application April 4, 1952, Serial No. 280,614

3 Claims. (Cl. 259—144)

This invention relates to improvements in implements for stirring various materials such as pastry ingredients, salads, sauces, etc.

The principal object of the invention is to provide a mixing paddle which takes the place of the ordinary mixing spoon, to the end that the mixer can be conveniently wiped off against the edge of the bowl instead of with another utensil or the operator's finger.

Another important object of the invention is to provide a simply constructed mixing device, that can be manufactured and retailed at a low monetary figure and which will be highly efficient in the uses above stated while also being useful in stirring food while cooking, for cake icings, sandwich spreads, etc.

Another important object of the invention is to provide a mixing paddle of the character stated which has a dull cutting edge for limited cutting action.

These and various other objects and advantages of the invention will become apparent to the reader of the following description.

Figure 1:
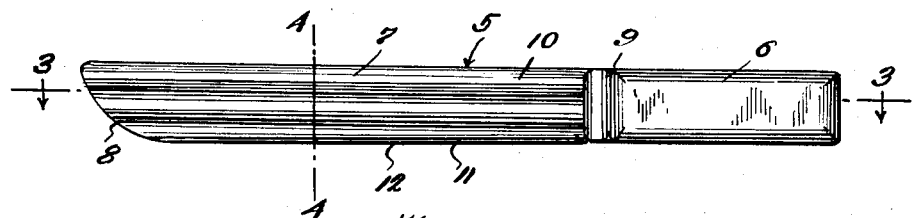
Figure 1 is a side elevational view of the implement.
Figure 2:
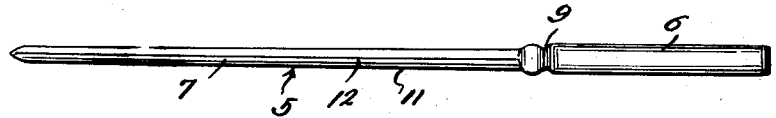
Figure 2 is an edge elevational view.
Figure 3:
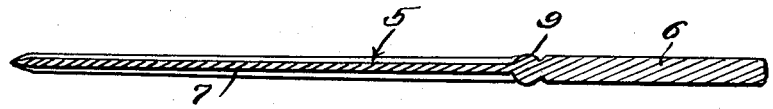
Figure 3 is a longitudinal sectional view taken on line 3—3 of Figure 1.
Figure 4:
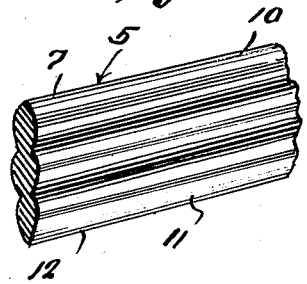
Figure 4 is a transverse fragmentary sectional view taken substantially on line 4—4 of Figure 1.

Referring to the drawing, wherein like numerals designate like parts, it can be seen that the paddle is generally referred to by numeral 5 and may be constructed of plastic, metal or hard wood.

The paddle is of elongated one piece construction and consists of a handle 6 and a paddle blade 7. The free end of the paddle blade 7 is curved inwardly as at 8 so that round bottom bowls can be easily wiped during mixing operations or when the bowl is to be cleaned.

The elongated body composed of handle 6 and blade 7 is formed with a constricted or neck portion 9 which can be used as a recess for the thumb in the operation of mixing materials.

From adjacent this neck portion 9 longitudinal corrugations run the length of the blade 7 forming two or more ribs 10 on each side of the blade, it being preferable that the lowermost rib 11 and of course the body portion on which these lowermost ribs 11 are formed, be tapered downwardly to a rather dull cutting edge 12. This edge may be used for cutting through dough and other soft materials and will of course be more useful in scraping the sidewalls of a bowl while mixing and for numerous other purposes.

The blade 7 represents about two-thirds of the length of the utensil, as is apparent in Figure 1.

The corrugations formed on the opposite sides of the blade 7 will assist materially in the thorough mixing of ingredients, particularly such items as brown sugar as well as other lump materials.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

1. A mixing paddle comprising an elongated body, said body being formed at one end to provide a handle, the remaining portion of the body defining a mixing blade, having longitudinal corrugations of substantially uniform thickness and spaced relation.

2. A mixing paddle comprising an elongated body, said body being formed at one end to provide a handle, the remaining portion of the body defining a mixing blade, having longitudinal ribs of uniform thickness and spaced relation, one rib having its outer longitudinal side sharpened to provide a cutting edge.

3. A mixing paddle comprising an elongated body, said body being formed at one end to provide a handle, the remaining portion of the body defining a mixing blade, having longitudinal ribs of uniform thickness and spaced relation on opposite sides thereof.

KENNETH D. HARP.

References Cited in the file of this patent

UNITED STATES PATENTS

| Number    | Name        | Date           |
|-----------|-------------|----------------|
| 1,926,944 | Hester      | Sept. 12, 1933 |
| 1,997,953 | Van Der Kuy | Apr. 16, 1935  |
| 2,566,112 | Barnard     | Aug. 28, 1951  |